United States Patent Office 2,896,801
Patented July 28, 1959

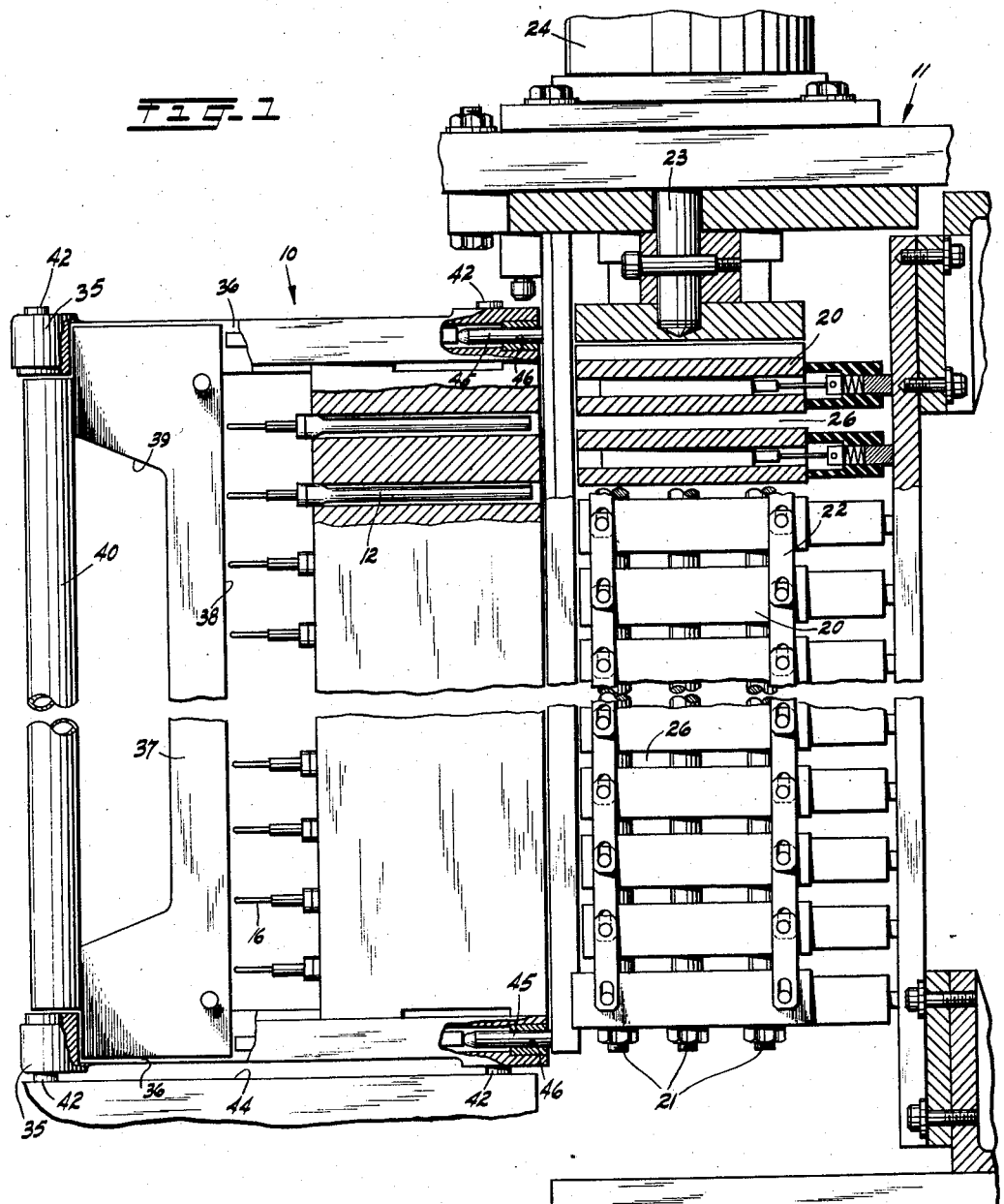

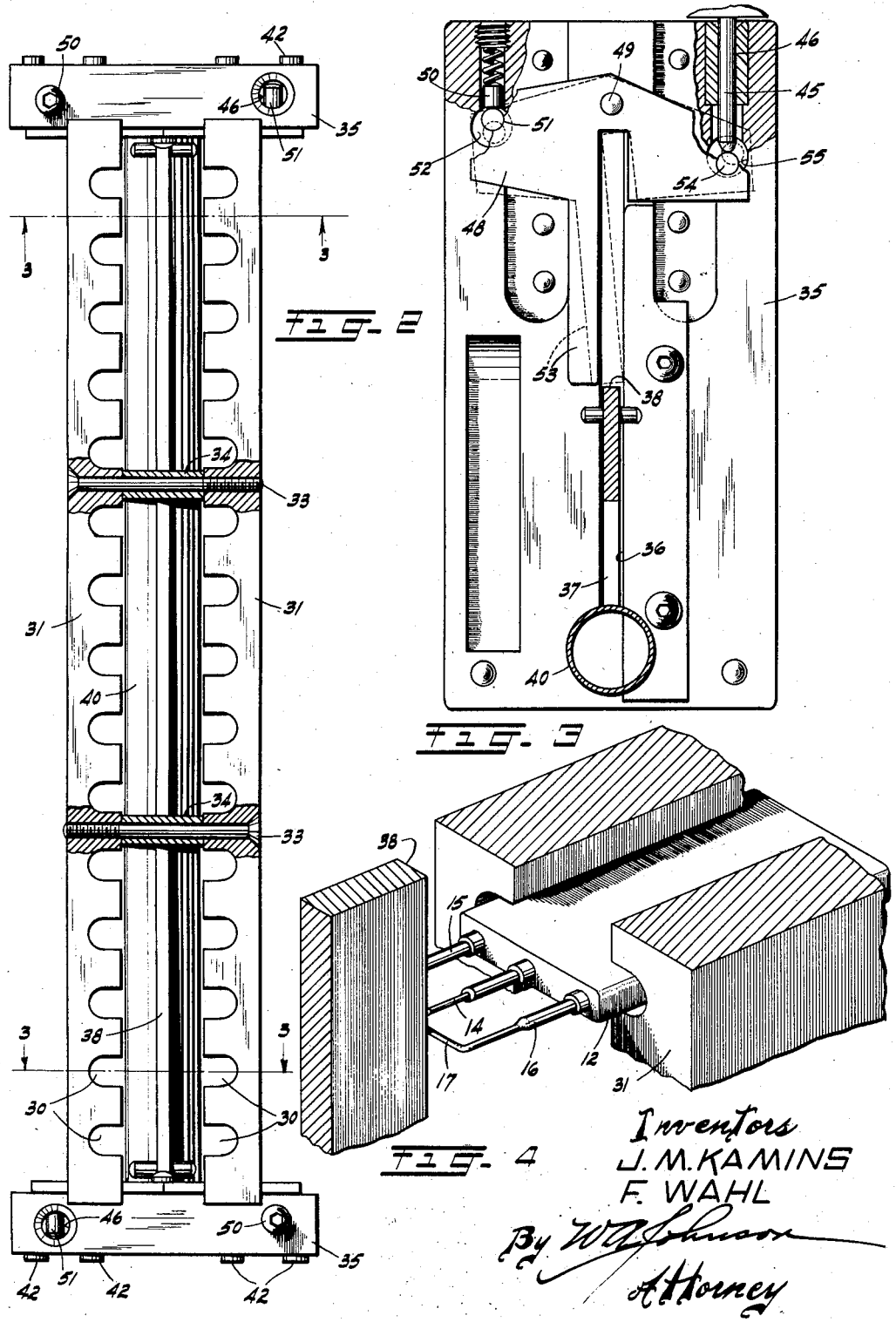

2,896,801

ARTICLE FEEDING MAGAZINE FOR INSULATOR COVER CURING MACHINE

Jack M. Kamins, New York, N.Y., and Frank Wahl, North Bergen, N.J., assignors to Western Electric Company, Incorporated, New York, N.Y., a corporation of New York Application May 14, 1957, Serial No. 659,101

6 Claims. (Cl. 214—16.6)

This invention relates to article feeding magazines particularly magazines for feeding a plurality of articles simultaneously to a like number of spaced receiving areas of a machine.

The manufacturing cost of articles depends largely upon machines capable of processing the articles, the number of articles which may be processed simultaneously and the speed at which large numbers of articles may be fed to machines of this type.

As an example turret type machines having numerous units spaced radially about the axis of the machine may have each unit adapted to receive a large number of articles such as paper wound resistors or condensers impregnated with suitable materials and which must be compressed and heated during their process of manufacture. The speed at which machines of this type may operate largely depends upon the speed at which the numerous articles may be fed to each unit of the machine.

The present object of the invention is a magazine which may be loaded manually with a given number of articles and space the articles for movement simultaneously into receiving areas of a machine.

In accordance with the object of the invention the magazine includes pockets spaced from each other according to the spacing of the receiving areas of a machine, to which articles, initially disposed in the pockets, are to be fed and an ejecting element mounted for movement relative to the pockets to move the article simultaneously from the pockets into their respective receiving areas. In the present instance one or more projections are mounted on each unit of the machine and serve not only to align the pockets and the articles therein with their respective receiving areas but to actuate one or more latches normally holding the ejecting element against movement relative to the pockets until the articles therein are aligned with their respective receiving areas.

Other objects and advantages will be apparent from the following detailed description when considered in conjunction with the accompanying drawings, wherein:

Fig. 1 is a side elevational view of the magazine ready to deliver articles to a machine;

Fig. 2 is a front elevational view of the magazine portions thereof being shown in section;

Fig. 3 is a sectional view taken along either line 3—3 of Fig. 2 with the vertical members removed to show the structure of the latch, and Fig. 4 is a fragmentary isometric view of a portion of the magazine illustrating an article about to be fed to the machine.

The magazine 10 was designed for a plurality of like units 11 of a turret type machine which is to process articles 12. The articles 12 in the present instance are resistors the main bodies of which include, in addition to the conductive materials disposed therein, a number of turns of dielectric material impregnated with a suitable material which will convert the main body of the article, particularly the outer shell-like portion thereof, into a rigid durable structure after heat and pressure have been applied thereto. The present article 12 has a central terminal 14 and outer terminals 15 and 16 which are joined at the present time by bar 17.

The unit 11 is composed of a number of pads 20 supported on rods 21 which extend through apertures in the pads and permit the pads to be spaced from each other, through the aid of connecting links when moved upwardly by piston rod 23 of an air cylinder 24. When the pads 20 are in their open position as shown in Fig. 1 they provide receiving areas 26 therebetween for the articles 12. After the articles are fed to the machine or unit the air cylinder may be operated to apply pressure to the articles and heat may be applied to the pads in a conventional manner.

In the present instance there are fifteen receiving areas 26 in each unit and for this reason the magazine 10 is provided with 15 pairs of pockets 30 disposed in the inner walls of vertical members 31 spaced from each other as shown in Fig. 2 and secured in their space positions by screws 33 and spacers 34. End members 35 are mounted on the ends of the vertical members 31 and have parallel slots 36 therein to receive the ends of an ejected element 37. The element 37 has a leading edge 38 positioned to engage the connecting bar 17 of each article and move the articles simultaneously from their pockets 30 into the receiving areas 26 of the unit 11. The element 37 is cut away at 39 for the greatest portion of its length to allow room for the operator's hand while gripping a handle 40, the ends of which are fixed to the trailing edge of the element.

Each end member 35 has supporting members 42 mounted at spaced positions on their outer surfaces whereby the magazine may be supported on either end member or either group of supporting members. In this manner the articles may be fed into the pockets from the forward or right end of the magazine while the magazine is in a horizontal position, then inverted to be supported on a table 44 for movement on either group of supports 42 toward the unit 11. The unit 11 has upper and lower projections 45 parallel with each other but at staggered, or out of line positions, to enter either socket 46 disposed in a similarly staggered relation as illustrated in Fig. 2.

Latches 48, which are similar in structure, are pivotally mounted at 49 on their respective end members 25 adjacent the inner surfaces thereof and adjacent the extremities of the vertical members 31. A spring pressed plunger unit 50, adjustably mounted in each end member, engages a pin 51 extending into an aperture 52 of the end member. The pin 51 is fixed to the latch 48 to be urged by the plunger unit 50 to normally move the latch until its projection 53 is positioned in front of the leading edge 38 of the ejecting element 37 as shown in dotted lines in Fig. 3. Each latch 48 has a pin 54 fixed thereto and extending into an aperture 55, of its end member, which is open to the socket 46, whereby the projection 45 when entering the socket will engage the pin and rock the latch 48 about its pivot from the dotted line position (Fig. 3) to the solid line position to free the ejecting element for movement to feed the articles to the machine.

During operation of the machine, the numerous units 11 thereof will be moved intermittently to a loading position where the table 44 will provide a surface over which any number of magazines 10, loaded with the articles 12 may be moved successively for registration of the sockets 46 with the projections 45. During this movement of the magazine the force applied to move it originates with the handle 40 and is applied directly to the ejecting element. However, the ejecting element is held against movement relative to the articles until interengagement of the projections 45 and the sockets 46 to assure, not only alignment of the articles in the pockets 30 with their respective receiving areas 26, but location of the magazine a predetermined distance from the receiving areas to permit the element 37, when free to move, to cause movement of all of the articles simultaneously to given locations in the machine. Although the articles may be loaded in the magazine singly or in pairs they (all 15) are removed from the magazine simultaneously, permitting loading of each unit with a large number of articles in a short length of time to permit the machine to operate at a maximum speed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A magazine for simultaneously feeding a plurality of articles to a like number of spaced receiving areas of a machine having a projection mounted at a given position relative to the receiving areas, the magazine comprising pockets spaced from each other according to the spacing of the receiving areas of the machine, an ejecting element mounted for movement relative to the pockets to move the articles simultaneously from the pockets into their respective receiving areas, means disposed at a given position relative to the pockets to receive the projection and to cooperate therewith to align the pockets with the receiving areas, and a latch normally holding the ejecting element against movement and actuable by the projection when received by the aligning means to release the ejecting element for movement.

2. A magazine for simultaneously feeding a plurality of articles to a like number of spaced receiving areas of a machine having a projection, the magazines comprising spaced parallel vertical members having aligned pairs of pockets in inner surfaces thereof facing each other to receive and support their respective sides of articles and position the articles spaced from each other according to the spacing of the receiving areas of the machine, end members fixed to the vertical members, and an ejecting element mounted for guided movement in the space between the vertical members to move the articles simultaneously from the pockets into their respective receiving areas, and a socket disposed in one of the end members to receive the projection to align the pairs of pockets with their receiving areas, and a latch normally holding the ejecting element against movement and moved by the projection free of the ejecting element when the projection enters the socket to release the ejecting element for movement.

3. A magazine for simultaneously feeding a plurality of articles to a like number of spaced receiving areas of a machine having a projection, the magazine comprising spaced parallel vertical members having aligned pairs of pockets in inner surfaces thereof to receive and support their respective sides of articles and position the articles spaced from each other according to the spacing of the receiving areas of the machine, end members fixed to the vertical members, and an ejecting element mounted for guided movement between the vertical members to move the articles simultaneously from the pockets into their respective receiving areas, and a socket disposed in one of the end members to receive the projection to align the pairs of pockets with their receiving areas, a latch pivotally supported by one of the end members and having a portion movable into closed position to hold the ejecting element against movement toward the articles, the latch being movable into open position by the projection entering the socket to free the ejecting element for movement toward the articles, and means supported by the adjacent end member to urge the latch into closed position when the ejecting element is returned to a starting position.

4. A magazine for simultaneously feeding a plurality of articles to a like number of spaced receiving areas of a machine having a projection, the magazine comprising spaced parallel vertical members having aligned pairs of pockets in inner surfaces thereof to receive and support their respective sides of articles and position the articles spaced from each other according to the spacing of the receiving areas of the machine, end members fixed to the vertical members, and an ejecting element mounted for guided movement between the vertical members to move the articles simultaneously from the pockets into their respective receiving areas, and a socket disposed in one of the end members to receive the projection to align the pairs of pockets with their receiving areas, a latch pivotally supported by one of the end members and having a portion movable into closed position to hold the ejecting element against movement toward the articles, the latch being movable into open position by the projection entering the socket to free the ejecting element for movement toward the articles, and means supported by the adjacent end member to urge the latch into closed position when the ejecting element is returned to a starting position, said ejecting element being returned to its starting position when utilized to remove the socket from the projection.

5. A magazine for simultaneously feeding a plurality of articles to a like number of spaced receiving areas of a machine having upper and lower projections disposed adjacent the extremities of the receiving areas, the magazine comprising spaced parallel vertical members having aligned pairs of pockets in inner surfaces thereof to receive and support their respective sides of articles and position the articles spaced from each other according to the spacing of the receiving areas of the machine, end members fixed to the ends of the vertical members and having parallel slots therein, an ejecting element supported between the end members for a guided movement between the vertical members with the ends of the ejecting element guided in the slots, a socket disposed in each end member to receive either upper or lower projection to align the pairs of pockets with their respective receiving areas, and supporting members mounted on the end members to adapt either end member and its supporting members to support the magazine for movement of the sockets into registration with the projections.

6. A magazine for simultaneously feeding a plurality of articles to a like number of spaced receiving areas of a machine having upper and lower projections disposed adjacent the extremities of the receiving areas, the magazine comprising spaced parallel vertical members having aligned pairs of pockets in inner surfaces thereof to receive and support their respective sides of articles and position the articles spaced from each other according to the spacing of the receiving areas of the machine, end members fixed to the ends of the vertical members and having parallel slots therein, an ejecting element supported between the end members for a guided movement between the vertical members with the ends of the ejecting element guided in the slots, a socket disposed in each end member to receive either upper or lower projection to align the pairs of pockets with their respective receiving areas, supporting members mounted on the end members to adapt either end member and its supporting members to support the magazine for movement of the sockets into registration with the projections, and latches pivotally mounted on the end members, normally urged to closed positions to hold the ejecting element against movement toward the articles and movable into open position by the projections entering the sockets to free the ejecting element for movement toward the articles.

References Cited in the file of this patent

UNITED STATES PATENTS

| | | |
|---|---|---|
| 1,768,360 | Jenney | June 24, 1930 |
| 1,975,855 | McBee | Oct. 9, 1934 |
| 2,386,076 | Taylor et al. | Oct. 2, 1945 |